Sept. 27, 1927. 1,643,549
J. O. DONNELLY ET AL
HOLE DIGGING MECHANISM
Filed Jan. 25, 1926 3 Sheets-Sheet 3
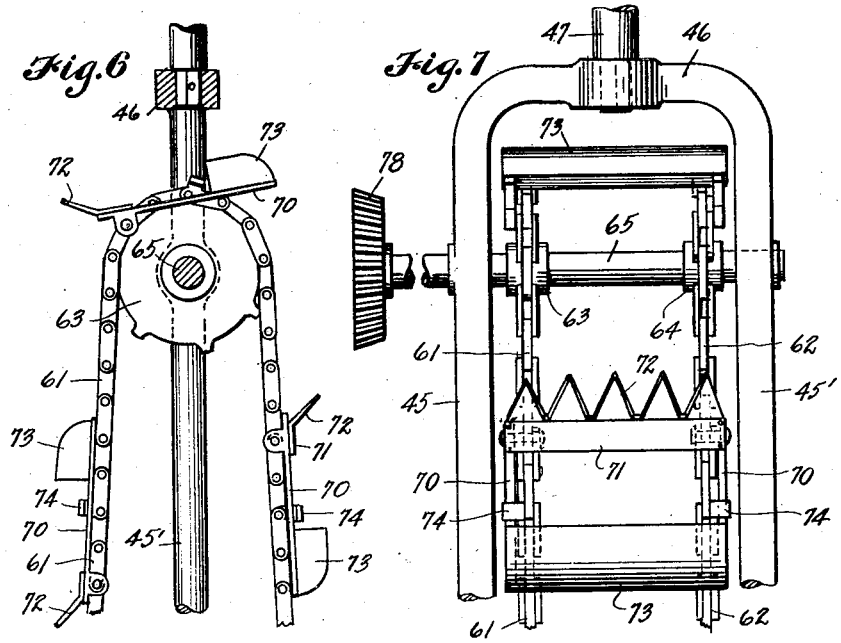
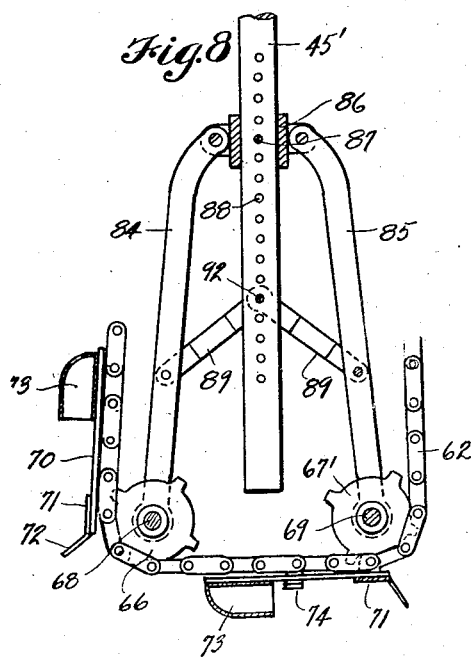
INVENTOR
JAMES O. DONNELLY
FRANCIS D. SIMMINGER
BY
Lynn A. Robinson
ATTORNEY Patented Sept. 27, 1927.

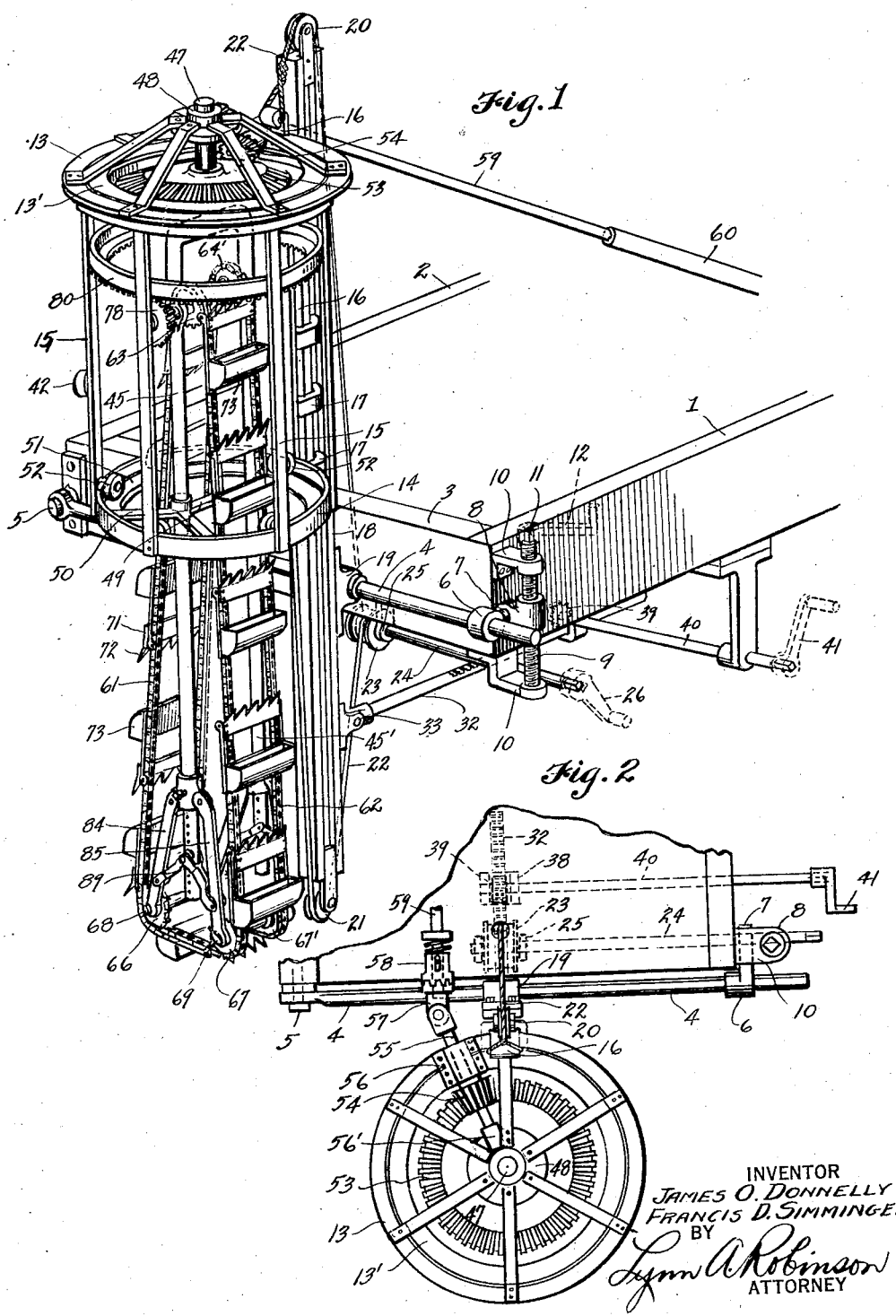

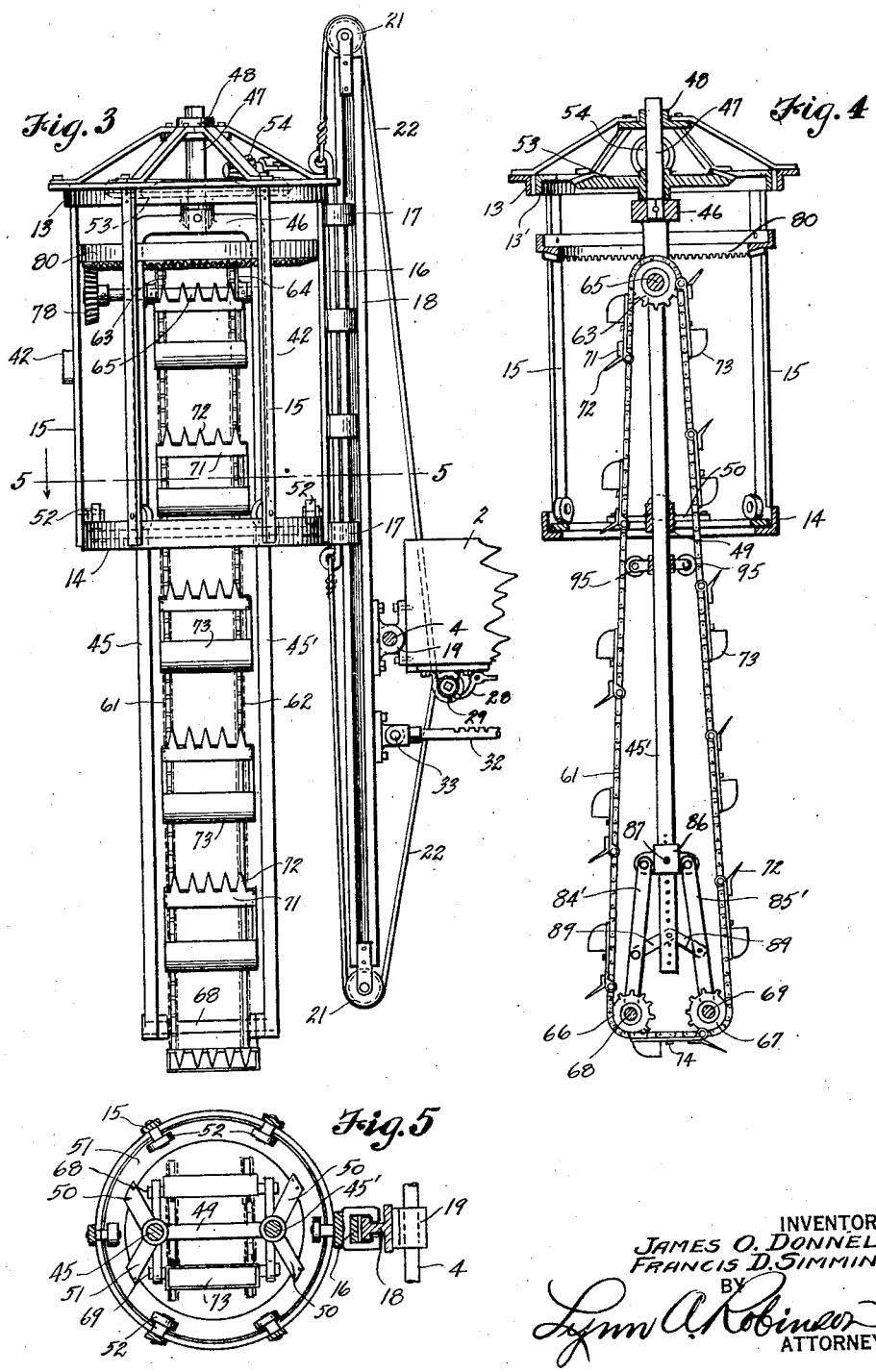

1,643,549

UNITED STATES PATENT OFFICE.

JAMES O. DONNELLY, OF HERNDON, AND FRANCIS D. SIMMINGER, OF LUDELL, KANSAS.

HOLE-DIGGING MECHANISM.

Application filed January 25, 1926. Serial No. 83,462.

This invention relates to earth boring mechanism and more particularly to machines for digging holes for posts, telegraph or telephone poles, or the like; the principal object of the invention being to provide a mechanism for the above purpose constructed for mounting on a wheeled vehicle, such as an auto-truck, and adapted to be operated through a driving connection with the vehicle motor or with an engine carried on the vehicle.

More specifically stated, the object of the invention resides in the provision of a post hole digging mechanism comprising a supporting frame structure that may be attached to the rear end of an auto truck frame and wherein there is revolubly mounted a vertically depending frame provided at its upper and lower ends with sprocket wheels about which endless conveyer chains operate and which carry a plurality of teeth and buckets whereby, when the lower end of the device is adjusted against the earth, the ground will be torn up and removed from the hole being dug.

Another object of the invention resides in the provision of a mechanism as above stated wherein means is provided for adjusting the supporting frame of the digging mechanism so that a vertical hole may be made regardless of any unlevelness of the truck frame. Also to provide means for adjusting the whole mechanism vertically so that the digging parts may be advanced down into the ground and then lifted from the hole when it is completed.

Another object of the invention is to provide mechanism whereby the conveyer chains are driven and whereby the frame structure that mounts the conveyer belts will be revolved about its vertical axis during operation of the machine so as to produce a round hole.

Another object of the invention resides in the details of construction whereby the parts are rendered adjustable so as to make possible the digging of holes of different diameter.

Still further objects reside in the various details of construction and combination of parts and in their mode of operation.

In accomplishing these and other objects of the invention we have provided the improved details of construction, the preferred forms of which are illustrated in the accompanying drawings, wherein—

Fig. 1 is a perspective view of a post hole digging mechanism embodied by the present invention; showing it as mounted at the rear end of an auto truck frame.

Fig. 2 is an upper end view of the same parts.

Fig. 3 is a side elevation of the mechanism.

Fig. 4 is a vertical section taken on the line 4—4 in Fig. 3, particularly illustrating the conveyer mechanism with the digging teeth and buckets thereon.

Fig. 5 is a horizontal section taken on the line 5—5 in Fig. 3.

Fig. 6 is an enlarged detail view of a part of the conveyer mechanism.

Fig. 7 is a side view of the same parts.

Fig. 8 is a detail of the lower end part of the conveyer, showing the means for adjusting the length of the horizontal run of the conveyer so as to produce holes of different diameters.

Referring more in detail to the several views of the drawings—

1 and 2 designate what may be the opposite side beams of an automobile truck frame and 3 an end beam joining the same and adjacent which, on the outside of the frame, is disposed a horizontal shaft 4 by means of which the digging device, embodied by the present invention, is supported. The shaft 4 is pivotally fixed at one end to the vehicle frame by means of a bolt or pin 5 and at its other end it is slidably fitted in a sleeve bearing 6 provided with a trunnion 7 fitted revolubly in a bearing 8 that is threaded onto a screw 9 supported vertically by a pair of brackets 10 and provided at its upper end with a squared head 11 for receiving a crank 12 whereby the screw may be revolved to effect vertical travel of the bearing 8 and in this way bring the supporting shaft 4 to a horizontal position regardless of whether the vehicle frame is transversely level or not.

The digging mechanism proper is supported in an upper frame structure consisting of a pair of angle iron rings 13 and 13' fitted one within the other at the top of the frame and an angle iron ring 14 at the base of the frame which is rigidly joined to the rings at the upper end of the frame by means of a plurality of vertical, spacing bars 15. Fixed vertically to one side of the cylindrical frame thus provided is a bar 16 to which a plurality of clips 17 are fastened in vertically spaced apart relation and by means of which the frame is slidably attached to an upright I-beam 18 provided toward its lower end with a supporting bearing 19 whereby it is pivotally mounted on the shaft 4, as is shown best in Fig. 3. At the upper and lower ends of the I-beam 18 are sheave wheels 20 and 21 about which a cable 22 is extended; this being attached at its ends to the opposite ends of the bar 16 and is extended about a winding drum 23 supported from the under side of the truck frame by means of a winding shaft 24 which is revoluble in supporting brackets 25 and extends to one side of the vehicle where it is equipped with a crank 26 for revolving the drum in one direction or another to wind the cable thereon for the purpose of raising or lowering the supporting frame of the digging mechanism along the I-beam 18. Suitable locking mechanism, such as a pawl 28 and a ratchet 29 is provided for retaining the drum against rotation when it is desired to hold the digging mechanism at any certain elevation.

For the purpose of plumbing the I-beam 18 when the vehicle is standing on an inclined surface toward the front or rear and after the cross bar 4 has been adjusted to a level position by manipulation of the screw 9, we have provided a rack bar 32 that is pivotally attached at one end to the I beam at a point somewhat below the bearing 19, as is shown at 33, and at its other end is slidable through a guide frame 38 that is fixed to the under side of the vehicle frame. A pinion 39 mounted on a turning shaft 40 meshes with the rack teeth and the shaft 40 extends to one side of the vehicle and is equipped with a crank 41 whereby it may be turned to adjust the bar 32 and incidentally adjust the position of the I-beam 18. Thus it is seen that by proper manipulation of the adjusting screw 9 and the rack bar 32, the I-beam may be adjusted to a plumb or perpendicular position regardless of any unlevelness of the vehicle on which it is mounted and this provides for the digging of vertical holes when the vehicle is standing on a hillside. Leveling or plumbing devices of any suitable character, such as are indicated at 42, may be attached at suitable places on the outer frame structure to facilitate the adjusting of the frame to the proper position.

Mounted revoluble in the longitudinal axial line of the cylindrical, outer frame is a conveyer supporting frame structure comprising a pair of parallel side bars 45 and 45' which are joined at their upper ends by a cross head 46 provided centrally with an upwardly extending shaft 47 that is revoluble in a bearing 48 carried centrally above the fixed frame. The side bars 45—45' are rigidly joined by a cross bar 49 from which laterally diverging arms 50 are extended for the rigid support of a guide ring 51 to which they are attached and which is fitted revolubly within the angle iron ring 14 at the lower end of the outer frame structure. Rollers 52 mounted on the vertical bars 15 of the outer frame engage in rolling contact with the top of the ring 51 to retain it in place within the angle iron ring 14. This vertical inner frame carries the conveyer mechanism, as will presently be described, and it is adapted to be revolubly driven by connection with the vehicle motor, or any other engine that may be mounted on the vehicle, but which has not been shown in the present drawings. The driving connection consists of a large bevel wheel 53 that is fixed on the shaft 47 and a driving gear 54 on a short shaft 55 carried in bearings 56 and 56' fixed respectively to the ring 13 and the central bearing 48. The shaft 55 is connected by means of a universal joint 57 with a yieldably releasable clutch collar 58 on a driving shaft 59 and this latter shaft has a sliding, adjustable connection with a continuing shaft 60 that is extended to the driving motor and operatively connected therewith. The releasable clutch provides for releasing the driving connection in the event that the digging mechanism becomes clogged or strikes in stony soil through which it cannot operate.

The digging and earth removing mechanism is carried by a pair of endless conveyer chains 61 and 62 which extend in parallel relation about a pair of sprocket wheels 63 and 64 on a cross shaft 65 extended through suitable bearings in the upper ends of the bars 45 and 45' and about paired sprocket wheels 66—66' and 67—67' carried respectively by shafts 68 and 69 at the lower end of the frame. These latter shafts are disposed in parallel, spaced relation in the same horizontal plane and the conveyer operates horizontally between these paired sprockets.

Fixed pivotally at their forward ends at regular intervals in paired relation to the two conveyer chains are bars 70 which are joined at their forward ends by transverse bars 71 provided with outwardly directed teeth 72 for digging up the earth as they move in contact therewith and carried by the other ends of these bars 70 are buckets 73 for scooping up the earth loosened by the teeth. The bars 70 which carry the teeth and buckets are prevented from swinging outwardly from the downward traveling side of the conveyer by means of lugs 74 that are fixed to the chains to overlie the bars as is shown in Figs. 6 and 7.

The means provided for driving the conveyer chains consists of a gear wheel 78 that is fixed to one end of the top cross shaft 65 and which operates in mesh with a ring gear 80 that is fixed within the outer fixed frame to the bars 15. Thus, as the inner frame structure is revolved about its vertical axis by the driving connection provided through the gears 53 and 54, the gear wheel 78 travels along the ring gear 80 and causes the shaft 65 and sprockets thereon to revolve and the conveyer to operate to dig up and elevate the dirt which will be discharged from the buckets due to the centrifugal force as the buckets pass over the sprockets at the top of the frame.

In order that holes of different diameter may be dug, we have provided for adjusting the two lower cross shafts 68 and 69 from and toward each other. These shafts are carried respectively by paired legs 84—84' and 85—85' which at their upper ends are pivotally attached to sleeves 86 that are slidable on the lower ends of the bars 45—45' and which may be held at adjusted positions by means of pins 87 extended therethrough and through holes 88 provided at spaced intervals in the bars.

The lower ends of these legs are held apart as desired by brace links 89 which are pivotally attached to the legs, as at 90, and to the bars 45—45' and also adapted to be adjusted to different positions and held by pins 92 extended through the holes 88.

Guide or idler wheels 95 are supported from the bars 45—45' to guide the conveyer chains in their travel.

Assuming that the device is so constructed, its operation is as follows: First the truck is moved to a position where it is desired to dig a hole, then the screw 9 is manipulated so as to bring the bar 4 into a level position and the shaft 40 is revolved so as to plumb the beam 18. Thus the digging mechanism is plumbed so as to dig a vertical hole. The lower sprockets are then adjusted so as to give a desirable distance of travel of the horizontal lower end portion of the conveyer so as to produce a hole of a desired diameter. The motor which drives the device is then started and this, through the driving shafts and gearing provided, causes the conveyer supporting frame to be revolved about its axis. As it is thus revolved, the gear wheel 78 on the outer end of shaft 65 which drives the conveyer chains, runs in mesh with the fixed ring gear 80 and this causes shaft 65 to revolve and the conveyer to be driven. The frame of the digging mechanism is then lowered along the beam 18 by means of unwinding the cable 23 from the drum and the lower end of the conveyer advanced against the ground so that the teeth 72 will dig up and loosen the earth and this is carried up by the buckets 73 and is discharged therefrom as the buckets pass over the top sprockets. It is apparent that since the whole conveyer mechanism revolves bodily about its vertical axis as the conveyer chains move upwardly, the hole that is produced will be cylindrical.

It is to be understood that we may desire to change certain details of construction to meet requirements for work in different kinds of soil and it is apparent that such changes could be made without departing from the spirit of the invention, and for this reason we do not wish to be limited only to the details of construction as herein shown.

Having thus described our invention, what we claim as new therein and desire to secure by Letters Patent is:

1. In a device of the character described, a horizontal shaft pivotally supported at one end, vertically adjustable means for supporting the other end of the said shaft, a hole digging mechanism pivotally mounted on the shaft to swing in a plane perpendicular thereto and means attached to said mechanism for retaining it at different positions of adjustment.

2. In a digging mechanism of the character described, a supporting frame structure, a conveyer frame suspended revolubly from the supporting frame, conveyer mounting wheels at the upper end of the said frame, paired conveyer wheels at the lower end of said frame, means for adjusting the latter wheels from and toward each other a conveyer operable about the said wheels, earth digging and removing means on the conveyer, means for revolving the conveyer frame axially and for driving the conveyer and means for adjusting the conveyer frame downwardly to cause said digging means to engage the earth.

3. In a machine of the character described, a supporting frame, a ring gear fixed within said frame, a conveyer frame disposed within the supporting frame coaxially of the ring gear and comprising parallel, opposite side bars extending substantially below the lower end of the supporting frame, a cross head joining the upper ends of said bars, a shaft extending upwardly from the cross head in the axial line of the frame, a driving gear on the said shaft, a horizontal shaft extended revolubly through the upper ends of said bars, a gear at the end of said shaft operating in mesh with the ring gear, a pair of sprocket wheels on said shaft between the side bars, a pair of arms at the lower end of each of said bars, means for adjusting the arms of each pair from and toward each other, cross shafts carried revolubly by corresponding arms of each pair, sprocket wheels on said shafts, endless conveyer chains operating about the wheels at upper and lower ends of the frame, cross bars carried by the chains, teeth on said bars and earth removing buckets carried by the conveyer chains.

Signed at Atwood, Rawlins County, Kansas, this 16th day of January, A. D., 1926.

JAMES O. DONNELLY.
FRANCIS D. SIMMINGER.